United States Patent
Liu

(10) Patent No.: US 10,368,192 B2
(45) Date of Patent: Jul. 30, 2019

(54) METHODS AND APPARATUSES FOR DETERMINING A PROXIMITY RELATION

(71) Applicant: Beijing Zhigu Rui Tuo Tech Co., Ltd, Beijing (CN)

(72) Inventor: Jia Liu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 280 days.

(21) Appl. No.: 15/317,778

(22) PCT Filed: Jun. 5, 2015

(86) PCT No.: PCT/CN2015/080830
§ 371 (c)(1),
(2) Date: Dec. 9, 2016

(87) PCT Pub. No.: WO2015/188723
PCT Pub. Date: Dec. 17, 2015

(65) Prior Publication Data
US 2017/0188193 A1    Jun. 29, 2017

(30) Foreign Application Priority Data
Jun. 11, 2014    (CN) .......................... 2014 1 0258323

(51) Int. Cl.
   *H04B 10/00*    (2013.01)
   *H04W 4/02*    (2018.01)
   *H04B 10/116*    (2013.01)

(52) U.S. Cl.
   CPC .......... *H04W 4/023* (2013.01); *H04B 10/116* (2013.01)

(58) Field of Classification Search
   CPC ........ H04B 10/116; H04B 1/38; H04B 10/40; H04B 17/318; H04W 4/023; H04W 4/029; H04W 4/025
(Continued)

(56) References Cited

U.S. PATENT DOCUMENTS 8,452,188 B2    5/2013    Shin et al.
8,552,836 B2 *    10/2013    Pollema ................... G05D 3/12
                                            244/137.4
(Continued)

FOREIGN PATENT DOCUMENTS

CN    102215068 A    10/2011
CN    102224744 A    10/2011
(Continued)

OTHER PUBLICATIONS

International Search Report for PCT Application No. PCT/CN2015/080830, dated Jul. 13, 2015, 3 pages.

*Primary Examiner* — Hibret A Woldekidan
(74) *Attorney, Agent, or Firm* — Amin, Turocy & Watson, LLP

(57) ABSTRACT

A proximity relation is determined in various example embodiments. A method can comprise: acquiring a proximity relation between devices and at least one visible light source associated with each device of the devices in at least one moment; and determining a proximity relation of the devices according to the proximity relation between the devices and at least one visible light source associated with each device of the devices in at least one moment. A solution is thus provided for determining a proximity relation without acquiring actual geographic locations of the devices, which improves security and protects user privacy.

25 Claims, 2 Drawing Sheets

(58) Field of Classification Search
USPC .................. 398/118, 128–131, 127, 182, 172
See application file for complete search history.

(56) References Cited

U.S. PATENT DOCUMENTS

| | | | | |
|---|---|---|---|---|
| 8,559,884 B2* | 10/2013 | Dolfini | ................... | H04W 4/02 |
| | | | | 455/41.1 |
| 8,658,975 B2* | 2/2014 | Lee | ........................... | G01J 3/02 |
| | | | | 250/330 |
| 8,693,877 B2* | 4/2014 | Tam | ................... | H03K 17/9631 |
| | | | | 398/118 |
| 8,705,015 B2* | 4/2014 | Chang | ..................... | G01C 3/08 |
| | | | | 356/3.01 |
| 9,084,235 B2 | 7/2015 | Steer et al. | | |
| 9,281,895 B2* | 3/2016 | Oshima | ............. | H04B 10/1143 |
| 9,386,666 B2* | 7/2016 | Economy | ............. | H04W 76/10 |
| 9,407,368 B2* | 8/2016 | Oshima | ............... | H04B 10/541 |
| 9,467,225 B2* | 10/2016 | Oshima | ................ | H04B 10/11 |
| 9,634,765 B2* | 4/2017 | Weda | ................ | H04B 10/1149 |
| 9,729,703 B2* | 8/2017 | Kobayashi | ............ | G06F 3/0488 |
| 10,142,019 B2* | 11/2018 | Chaudhuri | ............ | H04B 10/116 |
| 10,153,837 B2* | 12/2018 | Chaudhuri | ....... | H04B 10/07953 |
| 2003/0033389 A1* | 2/2003 | Simpson | ............. | H04L 41/0213 |
| | | | | 709/220 |
| 2009/0171571 A1 | 7/2009 | Son et al. | | |
| 2010/0053591 A1* | 3/2010 | Gibson | ................ | H04N 9/3129 |
| | | | | 356/3.09 |
| 2013/0010018 A1* | 1/2013 | Economy | .............. | H04W 76/10 |
| | | | | 345/691 |
| 2017/0347168 A1* | 11/2017 | Kim | ........................ | H04W 4/80 |
| 2018/0063420 A1* | 3/2018 | Kang | .................... | G06K 9/00604 |
| 2018/0219624 A1* | 8/2018 | Tsang | ................ | H04B 10/1141 |

FOREIGN PATENT DOCUMENTS

| | | |
|---|---|---|
| CN | 103199922 A | 7/2013 |
| CN | 103503493 A | 1/2014 |
| CN | 103841543 A | 6/2014 |
| CN | 104023310 A | 9/2014 |
| CN | 104038899 A | 9/2014 |

* cited by examiner

METHODS AND APPARATUSES FOR DETERMINING A PROXIMITY RELATION

RELATED APPLICATION

The present application is a U.S. National Stage filing under 35 U.S.C. § 371 of international patent cooperation treaty (PCT) application No. PCT/CN2015/080830, filed Jun. 5, 2015, and entitled "METHODS AND APPARATUSES FOR DETERMINING A PROXIMITY RELATION", which claims the benefit of priority to Chinese Patent Application No. 201410258323.0, filed on Jun. 11, 2014, which applications are hereby incorporated into the present application by reference herein in their respective entireties.

TECHNICAL FIELD

Embodiments of the present application relate to the field of communication technologies, and in particular, to methods and apparatuses for determining a proximity relation.

BACKGROUND

At present, some popular social software provides a function of finding people nearby, and the function is implemented by acquiring geographic locations of a local device and other devices and judging whether distances between the local device and the other devices are within a certain range. The function is implemented provided that location services are turned on for the local device and the other devices, that is, acquisition of geographic locations of the devices is allowed.

SUMMARY

In view of this, one example, non-limiting objective of one or more embodiments of the present application is to provide a solution for determining a proximity relation.

To achieve the example objective, in one example aspect, one or more embodiments of the present application provide a method for determining a proximity relation, the method comprising:

acquiring a proximity relation between a plurality of devices and at least one visible light source associated with each device of the plurality of devices in at least one moment; and determining a proximity relation of the plurality of devices according to the proximity relation between the plurality of devices and at least one visible light source associated with each device of the plurality of devices in at least one moment.

To achieve the example objective, in another aspect, one or more embodiments of the present application provide an apparatus for determining a proximity relation, the apparatus comprising:

an acquisition module, configured to acquire a proximity relation between a plurality of devices and at least one visible light source associated with each device of the plurality of devices in at least one moment; and a determination module, configured to determine a proximity relation of the plurality of devices according to the proximity relation between the plurality of devices and at least one visible light source associated with each device of the plurality of devices in at least one moment.

At least one technical solution in one or more of the above technical solutions has the following beneficial effects: one or more embodiments of the present application provide a solution for determining a proximity relation without acquiring actual geographic locations of devices by acquiring a proximity relation between a plurality of devices and at least one visible light source associated with each device of the plurality of devices in at least one moment and determining a proximity relation of the plurality of devices according to the proximity relation between the plurality of devices and at least one visible light source associated with each device of the plurality of devices in at least one moment, which improves security and protects user privacy.

BRIEF DESCRIPTION OF THE DRAWINGS

FIG. 2b is a schematic structural diagram of the example embodiment shown in FIG. 2a.

DETAILED DESCRIPTION

Example embodiments of the present application are described in detail hereinafter with reference to the accompanying drawings. The following embodiments are intended to describe the present application, but not to limit the scope of the present application.

It should be understood by those skilled in the art that the terms such as "first" and "second" in the present application are merely intended to distinguish different devices, modules or parameters, etc., which neither represent any particular technical meaning nor indicate a necessary logical sequence between them.

Figure 1:
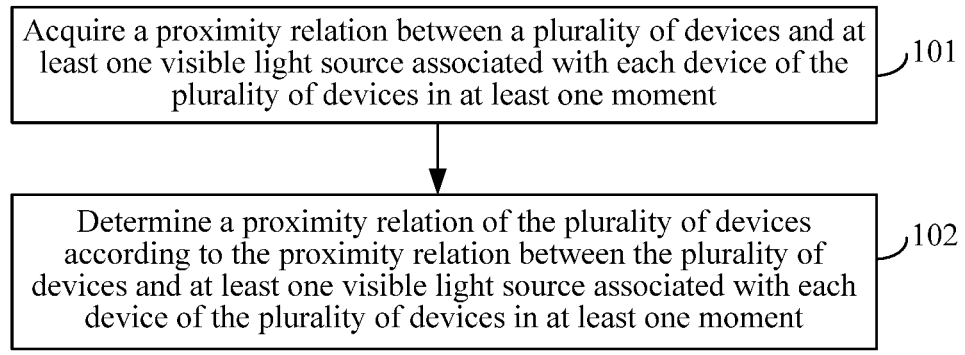
FIG. 1 is a schematic flowchart of an example embodiment of a method for determining a proximity relation according to the present application.

FIG. 1 is a schematic flowchart of an embodiment of a method for determining a proximity relation according to the present application. As shown in FIG. 1, this embodiment comprises:

101. Acquire a proximity relation between a plurality of devices and at least one visible light source associated with each device of the plurality of devices in at least one moment.

For example, an apparatus for determining a proximity relation as described in the first embodiment or the second embodiment of an apparatus for determining a proximity relation according to the present application performs the method embodiment, that is, performs 101-102. Specifically, the apparatus for determining a proximity relation may be integrated into any device in a form of software and/or hardware, or the apparatus for determining a proximity relation per se is a device. For example, the apparatus for determining a proximity relation may be integrated into one device in the plurality of devices or integrated into a device outside the plurality of devices; or the apparatus for determining a proximity relation may be one device in the plurality of devices or a device outside the plurality of devices.

In this embodiment, that any device is associated with at least one visible light source means that the device is within an irradiation range of each of the at least one visible light source associated with the device, that is, the device can receive information sent in a form of visible light by each of the at least one visible light source associated with the device. For example, if a device DA is associated with visible light sources LSA and LSB in a first moment, associated with visible light sources LSA and LSC in a second moment and associated with a visible light source LSD in a third moment and the device DA is associated with the visible light source LSB in a fourth moment, the visible light sources associated with the device DA in the four moments comprise: LSA, LSB, LSC and LSD.

In this embodiment, each device of the plurality of devices may be any device that can receive information sent in a form of visible light.

Considering that the laying angle and/or location of a mobile device may change, the mobile device may be associated with different visible light sources along with the changes; therefore, a proximity relation between a mobile device and at least one visible light source associated with the mobile device in each of multiple moments may be taken into account. Optionally, the plurality of devices comprises at least one mobile device; and the acquiring a proximity relation between a plurality of devices and at least one visible light source associated with each device of the plurality of devices in at least one moment comprises:

acquiring a proximity relation between the at least one mobile device and at least one visible light source associated with each mobile device of the at least one mobile device in multiple moments.

In this embodiment, the proximity relation optionally comprises: sorting of proximity, and/or proximity meeting a precondition. For example, a device DA is associated with visible light sources LSA and LSB in a first moment and associated with visible light sources LSA and LSC in a second moment, the device DA is associated with the visible light source LSB in a third moment and the device DA is associated with the visible light source LSB in a fourth moment, and a proximity relation between the device DA and the visible light sources LSA, LSB and LSC acquired in 101 may comprise: sorting of proximity between the device DA and the visible light sources LSA, LSB and LSC, for example, proximity between the device DA and the visible light source LSB is higher than proximity between the device DA and the visible light source LSA, and the proximity between the device DA and the visible light source LSA is higher than proximity between the device DA and the visible light source LSC, which can be expressed as: DA-LSB>DA-LSA>DA-LSC; alternatively, the precondition is one with the highest proximity, for example, the proximity relation acquired in 101 may comprise: the proximity between the device DA and the visible light source LSB is the highest; alternatively, the precondition is two with the highest proximity, for example, the proximity relation acquired in 101 may comprise: the proximity between the device DA and the visible light source LSB is the highest, and the proximity between the device DA and the visible light source LSA is the second-highest.

It is noted that, the at least one moment may be the same or different for each device in the plurality of devices. For example, for a device DA, a proximity relation between DA and at least one visible light source associated with DA in two moments of t=0 s and t=15 s is acquired in 101, and for a device DB, a proximity relation between DB and at least one visible light source associated with DB in a moment of t=5 s is acquired in 101. Optionally, for each device in the plurality of devices, the at least one moment is within the same time range. The time length of the same time range may be set according to mobility of devices, for example, if mobility of the plurality of devices is better, a proximity relation between each device of the plurality of devices and at least one visible light source associated with each device of the plurality of devices in at least one moment within the same time range of 30 s is acquired, and if the mobility of the plurality of devices is poorer, a proximity relation between each device of the plurality of devices and at least one visible light source associated with each device of the plurality of devices in at least one moment within the same time range of 10 minutes is acquired.

In this embodiment, with respect to at least one device in the plurality of devices, whether the device is a mobile device or not, the at least one moment is optionally multiple moments.

Specifically, in 101, the acquiring may be performed in many manners.

In one optional embodiment, the acquiring a proximity relation between a plurality of devices and at least one visible light source associated with each device of the plurality of devices in at least one moment comprises:

acquiring light source association information of each device of at least one device in the plurality of devices in each moment of the at least one moment, the light source association information comprising an identifier of each of at least one visible light source associated with the device in the moment; and with respect to each device of the at least one device, determining a proximity relation between the device and at least one visible light source associated with the device in at least one moment according to the light source association information of the device in each moment of the at least one moment.

That is to say, the apparatus for determining a proximity relation can determine a proximity relation between the device and at least one visible light source associated with the device according to the light source association information of the device.

Optionally, the identifier of each of at least one visible light source associated with the device in the moment is received by the device from the associated visible light source in a form of visible light within a certain time range corresponding to the moment. The time length of the certain time range can be determined according to at least one cycle during which each visible light source sends its identifier, and generally, the certain time range is not less than the at least one cycle during which each visible light source sends its identifier.

Optionally, the certain time range is a period of time that starts with the moment, or a period of time that ends with the moment, or a period of time that takes the moment as an intermediate point, which is not limited in this embodiment.

For example, the at least one cycle during which each visible light source sends its identifier is all 10 s, a device DA receives identifiers sent by visible light sources LSA, LSB and LSC within a time range of [5 s,15 s], and it can be considered that the device DA is associated with the visible light sources LSA, LSB and LSC in a moment of t=5 s, or it can be considered that the device DA is associated with the visible light sources LSA, LSB and LSC in a moment of t=15 s, or it can be considered that the device DA is associated with the visible light sources LSA, LSB and LSC in a moment of t=10 s.

Specifically, the proximity relation between the device and at least one visible light source associated with the device in at least one moment can be determined in many manners.

Optionally, the determining a proximity relation between the device and at least one visible light source associated with the device in at least one moment according to the light source association information of the device in each moment of the at least one moment comprises:

determining that proximity between the device and at least one visible light source all associated with the device in more moments is higher than proximity between the device and at least one visible light source only associated with the device in fewer moments.

For example, a device DA is associated with visible light sources LSA and LSB in a first moment and associated with visible light sources LSB and LSC in a second moment, and the device DA is associated with visible light sources LSA and LSB in a third moment; thus, DA is all associated with LSB in three moments, associated with LSA in two moments and only associated with LSC in one moment; correspondingly, it can be determined that proximity between DA and LSB is higher than proximity between the device DA and LSA, and the proximity between DA and LSA is higher than proximity between the device DA and LSC.

Optionally, the determining a proximity relation between the device and at least one visible light source associated with the device in at least one moment according to the light source association information of the device in each moment of the at least one moment comprises:

determining that proximity between the device and at least one visible light source all associated with the device in moments whose number is not less than a first number is the highest.

For example, a device DA is associated with visible light sources LSA and LSB in a first moment and associated with visible light sources LSB and LSC in a second moment, and the device DA is associated with visible light sources LSA and LSB in a third moment; thus, DA is all associated with LSB in three moments, associated with LSA in two moments and only associated with LSC in one moment; correspondingly, if the first number is 3, it can be determined that proximity between DA and LSB is the highest, and if the first number is 2, it can be determined that proximity between DA and LSB, LSA is the highest.

Optionally, if, for one device, only its light source association information in one moment is acquired, and if the device is associated with a plurality of visible light sources in the moment, it can be considered that proximity between the device and each of the plurality of visible light sources associated with the device in the moment is the same; if the device is only associated with one visible light source in the moment, it can be considered that proximity between the device and the one visible light source associated with the device in the moment is the highest.

In one possible scenario, the apparatus for determining a proximity relation is integrated into one device in the at least one device, or the apparatus for determining a proximity relation is one device in the at least one device. In the scenario, optionally, the apparatus for determining a proximity relation receives light source association information in each moment of the at least one moment respectively sent by other devices in the at least one device, and optionally, receives, via a wireless network, light source association information in each moment of the at least one moment respectively broadcast by other devices in the at least one device. In addition, optionally, the apparatus for determining a proximity relation receives an identifier of each of at least one visible light source respectively sent in a form of visible light by the at least one visible light source within at least one certain time range corresponding to at least one moment, to determine light source association information of a device in each moment of the at least one moment where the apparatus for determining a proximity relation belongs, and specifically, light source association information of the device in any moment comprises an identifier of each of at least one visible light source received by the apparatus for determining a proximity relation within a certain time range corresponding to the moment.

In another possible scenario, the apparatus for determining a proximity relation is integrated into a device outside the at least one device, or the apparatus for determining a proximity relation is a device outside the at least one device. In the scenario, optionally, the apparatus for determining a proximity relation receives light source association information in each moment of the at least one moment respectively sent by the at least one device.

In another optional embodiment, the acquiring a proximity relation between a plurality of devices and at least one visible light source associated with each device of the plurality of devices in at least one moment comprises:

receiving respectively from each device of at least one device of the plurality of devices, a proximity relation between the device and at least one visible light source associated with the device in at least one moment.

That is to say, with respect to the at least one device, the apparatus for determining a proximity relation can receive the proximity relation without, as described in the previous embodiment, determining the proximity relation according to light source association information. Optionally, a proximity relation between each device of the at least one device in the plurality of devices and at least one visible light source associated with the device in at least one moment broadcast by the device respectively is specifically received via a wireless network.

It can be known in combination with the embodiments that, during actual applications, with respect to any device in the plurality of devices, the apparatus for determining a proximity relation can determine a proximity relation between the device and at least one visible light source associated with the device according to light source association information of the device if acquiring the light source association information of the device, and processing may not be implicated if the proximity relation between the device and the at least one visible light source associated with the device is directly acquired.

102. Determine a proximity relation of the plurality of devices according to the proximity relation between the plurality of devices and at least one visible light source associated with each device of the plurality of devices in at least one moment.

The proximity relation of the plurality of devices is similar to the proximity relation between the devices and at least one visible light source associated therewith, which optionally comprises: sorting of proximity, and/or proximity meeting a precondition. For example, the plurality of devices comprises a device DA, a device DB and a device DC, and the proximity relation of the plurality of devices determined in 102 may comprise: sorting of proximity between each two of the devices DA, DB and DC, for example, proximity between DA and DB is higher than proximity between DB and DC, and the proximity between DB and DC is higher than proximity between DA and DC, which can be expressed as: DA-DB>DB-DC>DC-DA; alternatively, the precondition is one with the highest proximity, for example, the proximity relation of the plurality of devices determined in 102 may comprise: the proximity between DA and DB is the highest; alternatively, the precondition is two with the highest proximity, for example, the proximity relation of the plurality of devices determined in 102 may comprise: the proximity between DA and DB is the highest, and the proximity between DB and DC is the second-highest.

Specifically, the manner of determining a proximity relation of the plurality of devices may at least comprise any one of the following.

In one optional embodiment, the determining a proximity relation of the plurality of devices according to the proximity relation between the plurality of devices and at least one visible light source associated with each device of the plurality of devices in at least one moment comprises:

determining that proximity between at least two devices, at least one visible light source in the highest proximity with each of which has more identical visible light sources, is higher than proximity between at least two devices, at least one visible light source in the highest proximity with each of which has fewer identical visible light sources.

For example, the plurality of devices comprises devices DA, DB and DC; at least one visible light source associated with DA in at least one moment comprises: visible light sources LSA, LSB and LSC, and proximity between DA and LSA is the highest; at least one visible light source associated with DB in at least one moment comprises: visible light sources LSA, LSB and LSD, and proximity between DB and LSA is the highest; at least one visible light source associated with DC in at least one moment comprises: visible light sources LSB, LSD and LSE, and proximity between DC and LSD is the highest; thus, in the at least one visible light source associated with each device, the visible light source in the highest proximity with DA and DB are identical, while the visible light source in the highest proximity with DC is different from the visible light source in the highest proximity with DA and DB; therefore, the proximity relation determined in 102 may comprise: proximity between DA and DB is higher than proximity between DA and DC, and the proximity between DA and DB is higher than proximity between DB and DC.

For another example, the plurality of devices comprises devices DA, DB and DC; at least one visible light source associated with DA in at least one moment comprises: visible light sources LSA, LSB and LSC, and two visible light sources in the highest proximity with DA comprise: LSA and LSB; at least one visible light source associated with DB in at least one moment comprises: visible light sources LSA, LSB and LSD, and two visible light sources in the highest proximity with DB comprise: LSA and LSB; at least one visible light source associated with DC in at least one moment comprises: visible light sources LSB, LSD and LSE, and two visible light sources in the highest proximity with DC comprise: LSB and LSD; thus, the two visible light sources in the highest proximity respectively with DA and DB are identical, the two visible light sources in the highest proximity respectively with DA and DC have 1 identical one, and so it is with DB and DC; therefore, the proximity relation determined in 102 may comprise: proximity between DA and DB is higher than proximity between DA and DC, and the proximity between DA and DB is higher than proximity between DB and DC.

In another possible embodiment, the determining a proximity relation of the plurality of devices according to the proximity relation between the plurality of devices and at least one visible light source associated with each device of the plurality of devices in at least one moment comprises:

determining that proximity between at least two devices, at least one visible light source in the highest proximity with each of which has identical visible light sources whose number is not less than a second number, is the highest.

For example, the plurality of devices comprises devices DA, DB and DC; at least one visible light source associated with DA in at least one moment comprises: visible light sources LSA, LSB and LSC, and visible light sources in the highest proximity with DA comprise: LSA and LSB; at least one visible light source associated with DB in at least one moment comprises: visible light sources LSA, LSB and LSD, and visible light sources in the highest proximity with DB comprise: LSA and LSB; at least one visible light source associated with DC in at least one moment comprises: visible light sources LSB, LSD and LSE, and visible light sources in the highest proximity with DC comprise: LSB and LSD; thus, at least one visible light source in the highest proximity with DA and DB has 2 identical ones, at least one visible light source in the highest proximity with DB and DC has 1 identical one, and at least one visible light source in the highest proximity with DA and DC has 1 identical one; therefore, if the second number is 2, the proximity relation determined in 102 may comprise: proximity between DA and DB is the highest, and if the second number is 1, the proximity relation determined in 102 may comprise: proximity between DA and DB, proximity between DB and DC and proximity between DA and DC are all the highest.

It is noted that, the determining a proximity relation of the plurality of devices in 102 is optionally determining a proximity relation of any at least two pairs of devices in the plurality of devices, or determining a proximity relation between one device and any other devices by using the device as a reference. For example, the plurality of devices comprises devices DA, DB and DC, and relation of proximity between DA and DB, proximity between DB and DC and proximity between DA and DC are determined in 102, or relation of proximity between DA and DB and proximity between DA and DC are determined by using DA as a reference in 102.

Optionally, the plurality of devices comprises a first device and a plurality of second devices; and the determining a proximity relation of the plurality of devices according to the proximity relation between the plurality of devices and at least one visible light source associated with each device of the plurality of devices in at least one moment comprises:

determining a proximity relation between the first device and the plurality of second devices according to a proximity relation of at least one visible light source associated with the first device and the plurality of second devices in at least one moment.

Specifically, the apparatus for determining a proximity relation determines a proximity relation between the first device and the plurality of second devices by using the first device as a reference, that is to say, it is unnecessary to take into account a proximity relation of the plurality of second devices.

Correspondingly, the manner of determining a proximity relation between the first device and the plurality of second devices may at least comprise any one of the following.

In one optional embodiment, the determining a proximity relation between the first device and the plurality of second devices according to a proximity relation of at least one visible light source associated with the first device and the plurality of second devices in at least one moment comprises:

determining that proximity between the first device and at least one second device where at least one visible light source in the highest proximity with each of the at least one second device and at least one visible light source in the highest proximity with the first device have more identical visible light sources, is higher than proximity between the first device and at least one second device where at least one visible light source in the highest proximity with each of the at least one second device and at least one visible light source in the highest proximity with the first device have fewer identical visible light sources.

For example, at least one visible light source associated with a first device DA in at least one moment comprises: visible light sources LSA, LSB and LSC, and LSA is in the highest proximity with DA; at least one visible light source associated with a second device DB in at least one moment comprises: visible light sources LSA, LSB and LSD, and LSA is in the highest proximity with DB; at least one visible light source associated with a second device DC in at least one moment comprises: LSC, LSD and LSE, and LSD is in the highest proximity with DC; thus, at least one visible light source in the highest proximity with DA and DB has 1 identical one, and at least one visible light source in the highest proximity with DA and DC has 0 identical one; therefore, the proximity relation determined in 102 may comprise: proximity between DA and DB is higher than proximity between DA and DC.

In another optional embodiment, the determining a proximity relation between the first device and the plurality of second devices according to a proximity relation of at least one visible light source associated with the first device and the plurality of second devices in at least one moment comprises:

determining that proximity between the first device and at least one second device where at least one visible light source in the highest proximity with each of the at least one second device and at least one visible light source in the highest proximity with the first device have identical visible light sources whose number is not less than a third number, is the highest.

For example, if the third number is 1, at least one visible light source associated with a first device DA in at least one moment comprises: visible light sources LSA, LSB and LSC, and LSB is in the highest proximity with DA; at least one visible light source associated with a second device DB in at least one moment comprises: visible light sources LSA, LSB and LSD, and LSB is in the highest proximity with DB; at least one visible light source associated with a second device DC in at least one moment comprises: LSB, LSD and LSE, and LSB is in the highest proximity with DC; thus, at least one visible light source in the highest proximity with DB and at least one visible light source in the highest proximity with DA both have identical visible light sources whose number is not less than 1, and so it is with DC; therefore, the proximity relation determined in 102 may comprise: proximity between DA and DB and proximity between DA and DC are both the highest.

For another example, if the third number is 2, at least one visible light source associated with a first device DA in at least one moment comprises: visible light sources LSA, LSB and LSC, and LSA and LSB are in the highest proximity with DA; at least one visible light source associated with a second device DB in at least one moment comprises: visible light sources LSA, LSB and LSD, and LSA and LSB are in the highest proximity with DB; at least one visible light source associated with a second device DC in at least one moment comprises: LSB, LSD and LSE, and LSB is in the highest proximity with DC; thus, at least one visible light source in the highest proximity with DB and at least one visible light source in the highest proximity with DA have identical visible light sources whose number is not less than 2, and at least one visible light source in the highest proximity with DC and at least one visible light source in the highest proximity with DA only have 1 identical visible light source; therefore, the proximity relation determined in 102 may comprise: proximity between DA and DB is the highest.

It is noted that, the proximity relation of the plurality of devices determined in this embodiment may have many uses, for example, used for sharing information, establishing social relation and the like within a certain proximity range, which is not limited in this embodiment.

This embodiment determines a solution for determining a proximity relation without acquiring actual geographic locations of devices by acquiring a proximity relation between a plurality of devices and at least one visible light source associated with each device of the plurality of devices in at least one moment and determining a proximity relation of the plurality of devices according to the proximity relation between the plurality of devices and at least one visible light source associated with each device of the plurality of devices in at least one moment, which improves security and protects user privacy.

Figure 2A:
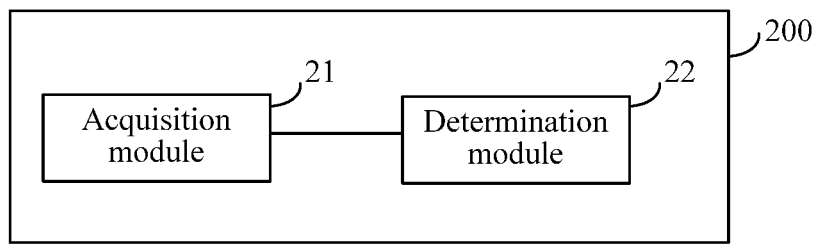
FIG. 2a is a schematic structural diagram of a first example embodiment of an apparatus for determining a proximity relation according to the present application.

FIG. 2*a* is a schematic structural diagram of a first embodiment of an apparatus for determining a proximity relation according to the present application. As shown in FIG. 2*a*, the apparatus for determining a proximity relation 200 (hereinafter referred to as apparatus 200) comprises:

an acquisition module 21, configured to acquire a proximity relation between a plurality of devices and at least one visible light source associated with each device of the plurality of devices in at least one moment; and a determination module 22, configured to determine a proximity relation of the plurality of devices according to the proximity relation between the plurality of devices and at least one visible light source associated with each device of the plurality of devices in at least one moment.

In this embodiment, the apparatus 200 may be integrated into any device in a form of software and/or hardware, or the apparatus for determining a proximity relation per se is a device. For example, the apparatus 200 may be integrated into one device in the plurality of devices or integrated into a device outside the plurality of devices; or the apparatus 200 may be one device in the plurality of devices or a device outside the plurality of devices.

In this embodiment, that any device is associated with at least one visible light source means that the device is within an irradiation range of each of the at least one visible light source associated with the device, that is, the device can receive information sent in a form of visible light by each of the at least one visible light source associated with the device. For example, if a device DA is associated with visible light sources LSA and LSB in a first moment, associated with visible light sources LSA and LSC in a second moment and associated with a visible light source LSD in a third moment and the device DA is associated with the visible light source LSB in a fourth moment, the visible light sources associated with the device DA in the four moments comprise: LSA, LSB, LSC and LSD.

In this embodiment, each device of the plurality of devices may be any device that can receive information sent in a form of visible light.

Considering that the laying angle and/or location of a mobile device may change, the mobile device may be associated with different visible light sources along with the changes; therefore, a proximity relation between a mobile device and at least one visible light source associated with the mobile device respectively in each of multiple moments may be taken into account. Optionally, the plurality of devices comprises at least one mobile device; and the acquisition module 21 is configured to: acquire a proximity relation between the at least one mobile device and at least one visible light source associated with each mobile device of the at least one mobile device in multiple moments.

In this embodiment, the proximity relation optionally comprises: sorting of proximity, and/or proximity meeting a precondition. By taking a proximity relation between a device and visible light sources as an example, a device DA is associated with visible light sources LSA and LSB in a first moment and associated with visible light sources LSA and LSC in a second moment, the device DA is associated with the visible light source LSB in a third moment and the device DA is associated with the visible light source LSB in a fourth moment, and a proximity relation between the device DA and the visible light sources LSA, LSB and LSC acquired by the acquisition module 21 may comprise: sorting of proximity between the device DA and the visible light sources LSA, LSB and LSC, for example, proximity between the device DA and the visible light source LSB is higher than proximity between the device DA and the visible light source LSA, and the proximity between the device DA and the visible light source LSA is higher than proximity between the device DA and the visible light source LSC, which can be expressed as: DA-LSB>DA-LSA>DA-LSC; alternatively, the precondition is one with the highest proximity, for example, the proximity relation acquired in 101 may comprise: the proximity between the device DA and the visible light source LSB is the highest; alternatively, the precondition is two with the highest proximity, for example, the proximity relation acquired in 101 may comprise: the proximity between the device DA and the visible light source LSB is the highest, and the proximity between the device DA and the visible light source LSA is the second-highest.

It is noted that, the at least one moment may be the same or different for each device in the plurality of devices. For example, for a device DA, the acquisition module 21 acquires a proximity relation between DA and at least one visible light source associated with DA in two moments of t=0 s and t=15 s, and for a device DB, the acquisition module 21 acquires a proximity relation between DB and at least one visible light source associated with DB in a moment of t=5 s. Optionally, for each device in the plurality of devices, the at least one moment is within the same time range. The time length of the same time range may be set according to mobility of devices, for example, if mobility of the plurality of devices is better, the acquisition module 21 acquires a proximity relation between each device of the plurality of devices and at least one visible light source associated with each device of the plurality of devices in at least one moment within the same time range of 30 s, and if the mobility of the plurality of devices is poorer, the acquisition module 21 acquires a proximity relation between each device of the plurality of devices and at least one visible light source associated with each device of the plurality of devices in at least one moment within the same time range of 10 minutes.

In this embodiment, with respect to at least one device in the plurality of devices, whether the device is a mobile device or not, the at least one moment is optionally multiple moments.

Specifically, the acquisition module 21 may acquire the proximity relation in many manners.

Figure 2B:
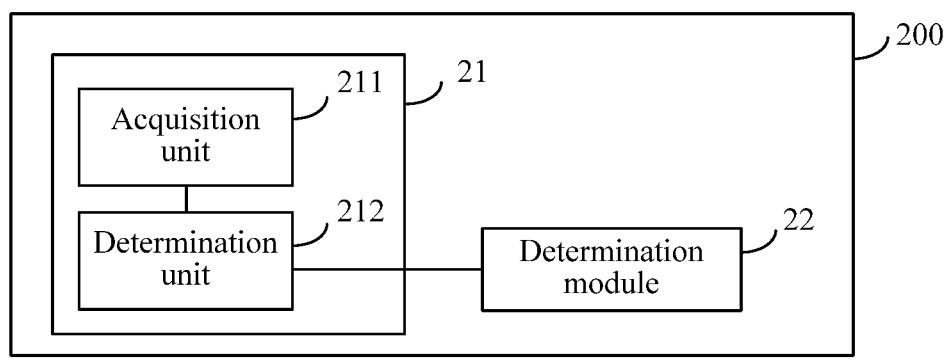

In one optional embodiment, as shown in FIG. 2b, the acquisition module 21 comprises:

an acquisition unit 211, configured to acquire light source association information of each device of at least one device in the plurality of devices in each moment of the at least one moment, the light source association information comprising an identifier of each of at least one visible light source associated with the device in the moment; and a determination unit 212, configured to, with respect to each device of the at least one device, determine a proximity relation between the device and at least one visible light source associated with the device in at least one moment according to the light source association information of the device in each moment of the at least one moment.

That is to say, the acquisition module 21 can acquire a proximity relation between the device and at least one visible light source associated with the device according to the light source association information of the device.

Optionally, the identifier of each of at least one visible light source associated with the device in the moment is received by the device from the associated visible light source in a form of visible light within a certain time range corresponding to the moment. The time length of the certain time range can be determined according to at least one cycle during which each visible light source sends its identifier, and generally, the certain time range is not less than the at least one cycle during which each visible light source sends its identifier.

Optionally, the certain time range is a period of time that starts with the moment, or a period of time that ends with the moment, or a period of time that takes the moment as an intermediate point, which is not limited in this embodiment.

For example, the at least one cycle during which each visible light source sends its identifier is all 10 s, a device DA receives identifiers sent by visible light sources LSA, LSB and LSC within a time range of [5 s, 15 s], and it can be considered that the device DA is associated with the visible light sources LSA, LSB and LSC in a moment of t=5 s, or it can be considered that the device DA is associated with the visible light sources LSA, LSB and LSC in a moment of t=15 s, or it can be considered that the device DA is associated with the visible light sources LSA, LSB and LSC in a moment of t=10 s.

Specifically, the determination unit 212 may determine the proximity relation between the device and at least one visible light source associated with the device in at least one moment in many manners.

Optionally, the determination unit 212 is configured to: determine that proximity between the device and at least one visible light source all associated with the device in more moments is higher than proximity between the device and at least one visible light source only associated with the device in fewer moments.

For example, a device DA is associated with visible light sources LSA and LSB in a first moment and associated with visible light sources LSB and LSC in a second moment, and the device DA is associated with visible light sources LSA and LSB in a third moment; thus, DA is all associated with LSB in three moments, associated with LSA in two moments and only associated with LSC in one moment; correspondingly, the determination unit 212 can determine that proximity between DA and LSB is higher than proximity between the device DA and LSA, and the proximity between DA and LSA is higher than proximity between the device DA and LSC.

Optionally, the determination unit 212 is configured to: determine that proximity between the device and at least one visible light source all associated with the device in moments whose number is not less than a first number is the highest.

For example, a device DA is associated with visible light sources LSA and LSB in a first moment and associated with visible light sources LSB and LSC in a second moment, and the device DA is associated with visible light sources LSA and LSB in a third moment; thus, DA is all associated with LSB in three moments, associated with LSA in two moments and only associated with LSC in one moment; correspondingly, if the first number is 3, the determination unit 212 can determine that proximity between DA and LSB is the highest, and if the first number is 2, the determination unit 212 can determine that proximity between DA and LSB, LSA is the highest.

Optionally, if, for one device, only its light source association information in one moment is acquired, and if the device is associated with a plurality of visible light sources in the moment, the determination unit 212 can consider that proximity between the device and each of the plurality of visible light sources associated with the device in the moment is the same; if the device is only associated with one visible light source in the moment, the determination unit 212 can consider that proximity between the device and the one visible light source associated with the device in the moment is the highest.

In one possible scenario, the apparatus 200 is integrated into one device in the at least one device, or the apparatus 200 is one device in the at least one device. In the scenario, optionally, the acquisition unit 211 receives light source association information in each moment of the at least one moment respectively sent by other devices in the at least one device, and optionally, receives, via a wireless network, light source association information in each moment of the at least one moment respectively broadcast by other devices in the at least one device. In addition, optionally, the acquisition unit 211 receives an identifier of each of at least one visible light source respectively sent in a form of visible light by the at least one visible light source within at least one certain time range corresponding to at least one moment, to determine light source association information in each moment of the at least one moment of a device where the apparatus 200 belongs, and, light source association information in any moment of the device where the apparatus 200 belongs comprises an identifier of each of at least one visible light source received by the acquisition unit 211 within a certain time range corresponding to the moment.

In another possible scenario, the apparatus 200 is integrated into a device outside the at least one device, or the apparatus 200 is a device outside the at least one device. In the scenario, optionally, the acquisition unit 211 receives light source association information in each moment of the at least one moment respectively sent by the at least one device.

In another optional embodiment, the acquisition module 21 is configured to: receive respectively from each device of at least one device of the plurality of devices, a proximity relation between the device and at least one visible light source associated with the device in at least one moment.

That is to say, with respect to the at least one device, the acquisition module 21 can receive the proximity relation, without, as described in the previous embodiment, determining the proximity relation according to light source association information. Optionally, the acquisition module 21 is configured to: receive a proximity relation between each device of the at least one device in the plurality of devices and at least one visible light source associated with the device in at least one moment broadcast by the device respectively via a wireless network.

It can be known in combination with the embodiments that, during actual applications, with respect to any device in the plurality of devices, the acquisition module 21 can determine a proximity relation between the device and at least one visible light source associated with the device according to light source association information of the device if acquiring the light source association information of the device, and processing may not be implicated if the proximity relation between the device and the at least one visible light source associated with the device is directly acquired.

In this embodiment, the proximity relation of the plurality of devices is similar to the proximity relation between the devices and at least one visible light source associated therewith, which optionally comprises: sorting of proximity, and/or proximity meeting a precondition. For example, the plurality of devices comprises a device DA, a device DB and a device DC, and the proximity relation of the plurality of devices determined by the determination module 22 may comprise: sorting of proximity between each two of the devices DA, DB and DC, for example, proximity between DA and DB is higher than proximity between DB and DC, and the proximity between DB and DC is higher than proximity between DA and DC, which can be expressed as: DA-DB>DB-DC>DC-DA; alternatively, the precondition is one with the highest proximity, for example, the proximity relation of the plurality of devices determined by the determination module 22 may comprise: the proximity between DA and DB is the highest; alternatively, the precondition is two with the highest proximity, for example, the proximity relation of the plurality of devices determined by the determination module 22 may comprise: the proximity between DA and DB is the highest, and the proximity between DB and DC is the second-highest.

Specifically, the manner in which the determination module 22 determines the proximity relation of the plurality of devices may at least comprise any one of the following.

In one optional embodiment, the determination module 22 is configured to:

determine that proximity between at least two devices, at least one visible light source in the highest proximity with each of which has more identical visible light sources, is higher than proximity between at least two devices, at least one visible light source in the highest proximity with each of which has fewer identical visible light sources.

For example, the plurality of devices comprises devices DA, DB and DC; at least one visible light source associated with DA in at least one moment comprises: visible light sources LSA, LSB and LSC, and proximity between DA and LSA is the highest; at least one visible light source associated with DB in at least one moment comprises: visible light sources LSA, LSB and LSD, and proximity between DB and LSA is the highest; at least one visible light source associated with DC in at least one moment comprises: visible light sources LSB, LSD and LSE, proximity between DC and LSD is the highest; thus, in the at least one visible light source associated with each device, the visible light source in the highest proximity with DA and DB are identical, while the visible light source in the highest proximity with DC is different from the visible light source in the highest proximity with DA and DB; therefore, the proximity relation determined by the determination module 22 may comprise: proximity between DA and DB is higher than proximity between DA and DC, and the proximity between DA and DB is higher than proximity between DB and DC.

For another example, the plurality of devices comprises devices DA, DB and DC; at least one visible light source associated with DA in at least one moment comprises: visible light sources LSA, LSB and LSC, and two visible light sources in the highest proximity with DA comprise: LSA and LSB; at least one visible light source associated with DB in at least one moment comprises: visible light sources LSA, LSB and LSD, and two visible light sources in the highest proximity with DB comprise: LSA and LSB; at least one visible light source associated with DC in at least one moment comprises: visible light sources LSB, LSD and LSE, and two visible light sources in the highest proximity with DC comprise: LSB and LSD; thus, the two visible light sources in the highest proximity respectively with DA and DB are identical, the two visible light sources in the highest proximity respectively with DA and DC have 1 identical one, and so it is with DB and DC; therefore, the proximity relation determined by the determination module 22 may comprise: proximity between DA and DB is higher than proximity between DA and DC, and the proximity between DA and DB is higher than proximity between DB and DC.

In another possible embodiment, the determination module 22 is configured to: determine that proximity between at least two devices, at least one visible light source in the highest proximity with each of which has identical visible light sources whose number is not less than a second number, is the highest.

For example, the plurality of devices comprises devices DA, DB and DC; at least one visible light source associated with DA in at least one moment comprises: visible light sources LSA, LSB and LSC, and visible light sources in the highest proximity with DA comprise: LSA and LSB; at least one visible light source associated with DB in at least one moment comprises: visible light sources LSA, LSB and LSD, and visible light sources in the highest proximity with DB comprise: LSA and LSB; at least one visible light source associated with DC in at least one moment comprises: visible light sources LSB, LSD and LSE, and visible light sources in the highest proximity with DC comprise: LSB and LSD; thus, at least one visible light source in the highest proximity with DA and DB has 2 identical ones, at least one visible light source in the highest proximity with DB and DC has 1 identical one, and at least one visible light source in the highest proximity with DA and DC has 1 identical one; therefore, if the second number is 2, the proximity relation determined by the determination module 22 may comprise: proximity between DA and DB is the highest, and if the second number is 1, the proximity relation determined by the determination module 22 may comprise: proximity between DA and DB, proximity between DB and DC and proximity between DA and DC are all the highest.

It is noted that, the determining a proximity relation of the plurality of devices by the determination module 22 is optionally determining a proximity relation of any at least two pairs of devices in the plurality of devices, or determining a proximity relation between one device and any other devices by using the device as a reference. For example, the plurality of devices comprises devices DA, DB and DC, and the determination module 22 determines relation of proximity between DA and DB, proximity between DB and DC and proximity between DA and DC, or the determination module 22 determines relation of proximity between DA and DB and proximity between DA and DC by using DA as a reference.

Optionally, the plurality of devices comprises a first device and a plurality of second devices; and the determination module 22 is configured to: determine a proximity relation between the first device and the plurality of second devices according to a proximity relation of at least one visible light source associated with of the first device and the plurality of second devices in at least one moment.

Specifically, the determination module 22 determines a proximity relation between the first device and the plurality of second devices by using the first device as a reference, that is to say, it is unnecessary to take into account a proximity relation of the plurality of second devices.

Correspondingly, the manner in which the determination module 22 determines a proximity relation between the first device and the plurality of second devices may at least comprise any one of the following.

In one optional embodiment, the determination module 22 is configured to: determine that proximity between the first device and at least one second device where at least one visible light source in the highest proximity with each of the at least one second device and at least one visible light source in the highest proximity with the first device have more identical visible light sources, is higher than proximity between the first device and at least one second device where at least one visible light source in the highest proximity with each of the at least one second device and at least one visible light source in the highest proximity with the first device have fewer identical visible light sources.

For example, at least one visible light source associated with a first device DA in at least one moment comprises: visible light sources LSA, LSB and LSC, and LSA is in the highest proximity with DA; at least one visible light source associated with a second device DB in at least one moment comprises: visible light sources LSA, LSB and LSD, and LSA is in the highest proximity with DB; at least one visible light source associated with a second device DC in at least one moment comprises: LSC, LSD and LSE, and LSD is in the highest proximity with DC; thus, at least one visible light source in the highest proximity with DA and DB has 1 identical one, and at least one visible light source in the highest proximity with DA and DC has 0 identical one; therefore, the proximity relation determined by the determination module 22 may comprise: proximity between DA and DB is higher than proximity between DA and DC.

In another optional embodiment, the determination module 22 is configured to: determine that proximity between the first device and at least one second device where at least one visible light source in the highest proximity with each of the at least one second device and at least one visible light source in the highest proximity with the first device have identical visible light sources whose number is not less than a third number, is the highest.

For example, if the third number is 1, at least one visible light source associated with a first device DA in at least one moment comprises: visible light sources LSA, LSB and LSC, and LSB is in the highest proximity with DA; at least one visible light source associated with a second device DB in at least one moment comprises: visible light sources LSA, LSB and LSD, and LSB is in the highest proximity with DB; at least one visible light source associated with a second device DC in at least one moment comprises: LSB, LSD and LSE, and LSB is in the highest proximity with DC; thus, at least one visible light source in the highest proximity with DB and at least one visible light source in the highest proximity with DA both have identical visible light sources whose number is not less than 1, and so it is with DC; therefore, the proximity relation determined by the determination module 22 may comprise: proximity between DA and DB and proximity between DA and DC are both the highest.

For another example, if the third number is 2, at least one visible light source associated with a first device DA in at least one moment comprises: visible light sources LSA, LSB and LSC, and LSA and LSB are in the highest proximity with DA; at least one visible light source associated with a second device DB in at least one moment comprises: visible light sources LSA, LSB and LSD, and LSA and LSB are in the highest proximity with DB; at least one visible light source associated with a second device DC in at least one moment comprises: LSB, LSD and LSE, and LSB is in the highest proximity with DC; thus, at least one visible light source in the highest proximity with DB and at least one visible light source in the highest proximity with DA have identical visible light sources whose number is not less than 2, and at least one visible light source in the highest proximity with DC and at least one visible light source in the highest proximity with DA only have 1 identical visible light source; therefore, the proximity relation determined by the determination module 22 may comprise: proximity between DA and DB is the highest.

It is noted that, the proximity relation of the plurality of devices determined by the determination module 22 in this embodiment may have many uses, for example, used for sharing information, establishing social relation and the like within a certain proximity range, which is not limited in this embodiment.

This embodiment determines a solution for determining a proximity relation without acquiring actual geographic locations of the device by acquiring, by an acquisition module in an apparatus for determining a proximity relation, a proximity relation between a plurality of devices and at least one visible light source associated with each device of the plurality of devices in at least one moment and determining, by a determination module in the apparatus, a proximity relation of the plurality of devices according to the proximity relation between the plurality of devices and at least one visible light source associated with each device of the plurality of devices in at least one moment, which improves security and protects user privacy.

Figure 3:
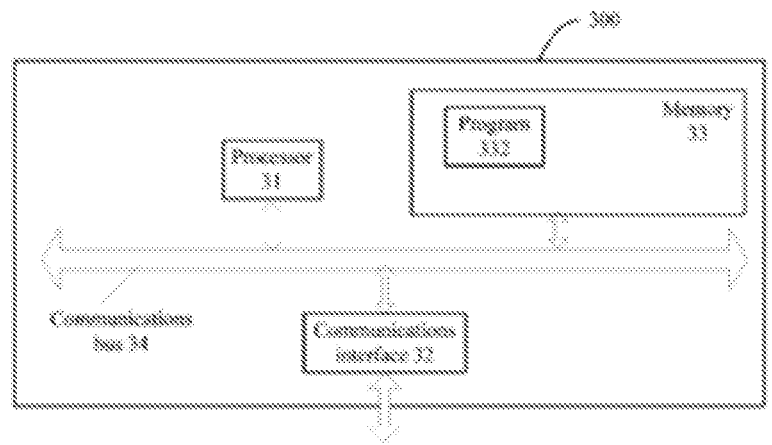
FIG. 3 is a schematic structural diagram of a second example embodiment of an apparatus for determining a proximity relation according to the present application.

FIG. 3 is a schematic structural diagram of a second embodiment of an apparatus for determining a proximity relation according to the present application. As shown in FIG. 3, the apparatus for determining a proximity relation 300 comprises:

a processor 31, a Communications Interface 32, a memory 33, and a communications bus 34.

The processor 31, the Communications Interface 32, and the memory 33 accomplish mutual communications via the communications bus 34.

The Communications Interface 32 is configured to communicate with external devices.

Optionally, the apparatus for determining a proximity relation 300 further comprises components configured to receive and identify visible light signals, for example, a photoelectric diode, an image sensor and so on.

The processor 31 is configured to execute a program 332, and, can implement relevant steps in the method embodiments.

Specifically, the program 332 may comprise a program code, the program code comprising a computer operation instruction.

The processor 31 may be a central processing unit (CPU), or an application specific integrated circuit (ASIC), or be configured to be one or more integrated circuits which implement the method embodiments.

The memory 33 is configured to store the program 332. The memory 33 may comprise a high-speed RAM memory, and may also comprise a non-volatile memory, for example, at least one magnetic disk memory. The program 332 may be configured to cause the apparatus for determining a proximity relation 300 to implement the following steps:

acquiring a proximity relation between a plurality of devices and at least one visible light source associated with each device of the plurality of devices in at least one moment; and determining a proximity relation of the plurality of devices according to the proximity relation between the plurality of devices and at least one visible light source associated with each device of the plurality of devices in at least one moment.

Figure 4:
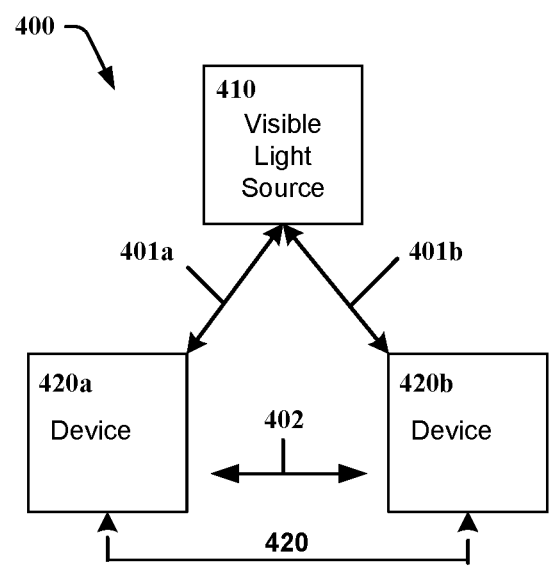
FIG. 4 is a schematic structural diagram of another example embodiment that, using devices and a visible light source, determines proximity relation(s), in accordance with one or more embodiments of the subject application.

FIG. 4 is a schematic structural diagram of another example embodiment that, using devices and a visible light source, determines proximity relation(s), in accordance with one or more embodiments of the subject application. In FIG. 4, a first proximity relation 401a and 401b is acquired between a visible light source 410 and device 420a and device 420b of devices 420. A second proximity relation 402 is determined according to the first proximity relation 401a and/or first proximity relation 401b.

Reference can be made to corresponding description in the corresponding steps and units in the method embodiments for implementation of the steps in the program 332, which is not repeated herein. Those skilled in the art can clearly understand that, reference can be made to the corresponding process description in the method embodiments for the devices described above and the specific working procedures of the modules, and will not be repeated herein in order to make the description convenient and concise. It is noted that, the proximity relation of the plurality of devices determined in this embodiment may have many uses, for example, configured to share information, establish a social relation and the like within a certain proximity range, which is not limited in this embodiment.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can be configured to store program codes.

The above embodiments are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A method, comprising:
  acquiring, by a system comprising a processor, a first proximity relation between devices and at least one visible light source associated with each device of the devices in at least one moment, wherein the devices are configured to receive information in a form of visible light; and
  determining a second proximity relation of the devices according to the first proximity relation,
  wherein the acquiring the first proximity relation comprises:
    acquiring light source association information of each device of at least one device of the devices in each moment of the at least one moment, the light source association information comprising a respective identifier of each of the at least one visible light source associated with each device in each moment of the at least one moment, and
    with respect to each device of the at least one device, determining the first proximity relation between each device and the at least one visible light source associated with each device in the at least one moment according to the light source association information of each device in each moment of the at least one moment, and
  wherein the determining the second proximity relation of the devices according to the first proximity relation comprises at least one of:
    sorting the first proximity relation and the second proximity relation, or
    determining the first proximity relation satisfies a condition.

2. The method of claim 1, wherein the respective identifier of each of the at least one visible light source associated with each device in each moment is received by each device from associated one or more visible light sources in a form of visible light within a certain time range corresponding to the moment.

3. The method of claim 1, wherein the determining the first proximity relation between each device and the at least one visible light source associated with each device in the at least one moment according to the light source association information of each device in each moment of the at least one moment comprises:
  determining that a first proximity between a device and one or more visible light sources associated with the device in a first number of moments is higher than a second proximity between the device and one or more visible light sources associated with the device in a second number of moments fewer than the first number of moments.

4. The method of claim 1, wherein the determining the first proximity relation between each device and the at least one visible light source associated with each device in the at least one moment according to the light source association information of each device in each moment of the at least one moment comprises:
  determining that a first proximity between a device of the at least one device of the devices and one or more visible light sources associated with the device in a first number of moments, greater than or equal to a defined number, is a highest proximity.

5. The method of claim 1, wherein the acquiring the first proximity relation between the devices and the at least one visible light source associated with each device of the devices in the at least one moment comprises:
  receiving, respectively from each device of the at least one device of the devices, the first proximity relation between each device and one or more visible light sources associated with each device in the at least one moment.

6. The method of claim 1, wherein the determining the second proximity relation of the devices according to the first proximity relation comprises:
  determining that a first proximity between at least two devices of a first set is higher than a second proximity between at least two devices of a second set, wherein a first set of visible light sources with highest proximity to each of the at least two devices of the first set has visible light sources that are determined to be more similar than a second set of visible light sources with highest proximity to each of the at least two devices of the second set.

7. The method of claim 1, wherein the determining the second proximity relation of the devices according to the first proximity relation comprises:
  determining that a first proximity between at least two devices of a set is a highest proximity, wherein one or more visible light sources with the highest proximity to each of the at least two devices of the set are determined to have at least a defined number of identical visible light sources.

8. The method of claim 1, wherein the devices comprise a first device and second devices; and the determining the second proximity relation of the devices comprises:
  determining the second proximity relation between the first device and the second devices according to the first proximity relation between the first device and one or more visible light sources associated with the first device in the at least one moment and the first proximity relation between each of the second devices and one or more visible light sources associated with each of the second devices in the at least one moment.

9. The method of claim 8, wherein the determining the second proximity relation between the first device and the second devices comprises:
  determining that a proximity between the first device and a first set of the second devices is higher than another proximity between the first device and a second set of the second devices, wherein a first set of visible light sources comprising one or more first visible light sources in highest proximity with each of the first set of the second devices and a second set of visible light sources comprising one or more second visible light sources in highest proximity with the first device is determined to have more identical visible light sources than a third set of visible light sources comprising one or more third visible light sources in highest proximity with each of the second set of the second devices and the second set of visible light sources.

10. The method of claim 8, wherein the determining the second proximity relation between the first device and the second devices comprises:
   determining that a proximity between the first device and a first set of the second devices is a highest proximity, wherein a set of visible light sources comprising one or more first visible light sources in highest proximity with each of the first set of second devices and one or more second visible light sources in highest proximity with the first device are determined to have at least a number of identical visible light sources, and wherein the number is not less than a defined number.

11. The method of claim 1, wherein the devices comprise at least one mobile device, and the acquiring the first proximity relation between the devices and the at least one visible light source comprises:
   acquiring the first proximity relation between the at least one mobile device and the at least one visible light source associated with each mobile device of the at least one mobile device in multiple moments of the at least one moment.

12. An apparatus, comprising:
   a memory that stores executable modules; and
   a processor, coupled to the memory, that executes or facilitates execution of the executable modules, comprising:
      an acquisition module configured to acquire a first proximity relation between devices and at least one visible light source associated with each device of the devices in at least one moment, wherein the devices are configured to receive information in a form of visible light; and
      a determination module configured to determine a second proximity relation of the devices according to the first proximity relation,
   wherein the acquisition module comprises:
      an acquisition unit configured to acquire light source association information of each device of at least one device of the devices in each moment of the at least one moment, wherein the light source association information comprises at least one identifier respectively corresponding to the at least one visible light source associated with each device in each moment of the at least one moment, and
      a determination unit configured to, with respect to each device of the at least one device, determine the first proximity relation between each device and the at least one visible light source associated with each device in the at least one moment according to the light source association information of each device in each moment of the at least one moment, and
   wherein the determination of the second proximity relation of the devices according to the first proximity relation comprises at least one of:
      a sortation of the first proximity relation and the second proximity relation, or
      an attainment by the first proximity relation of a precondition.

13. The apparatus of claim 12, wherein the at least one identifier respectively corresponding to the at least one visible light source associated with each device in each moment is received by each device from associated light sources in a form of visible light within a respective time range corresponding to each moment of the at least one moment.

14. The apparatus of claim 12, wherein the determination unit is configured to:
   determine that a first proximity between a device and one or more first visible light sources associated with the device in a first number of moments is higher than a second proximity between the device and one or more visible light sources associated with the device in a second number of moments fewer than the first number of moments.

15. The apparatus of claim 12, wherein the determination unit is configured to:
   determine that a proximity between a device of the at least one device of the devices and one or more visible light sources associated with the device in a first number of moments, greater than or equal to a defined number, is a highest proximity.

16. The apparatus of claim 12, wherein the acquisition module is configured to:
   receive, respectively from each device of the at least one device of the devices, the first proximity relation between each device and one or more visible light source associated with each device in the at least one moment.

17. The apparatus of claim 12, wherein the determination module is configured to:
   determine that a first proximity between at least two devices of a first set is higher than a second proximity between at least two devices of a second set, wherein a first set of one or more first visible light sources in highest proximity with each of the at least two devices of the first set is determined to have more identical visible light sources than a second set of one or more second visible light sources in highest proximity with each of the at least two devices of the second set.

18. The apparatus of claim 12, wherein the determination module is configured to:
   determine that a first proximity between at least two devices of a set is a highest proximity, wherein one or more visible light sources in highest proximity with each of the at least two devices of the set are determined to have identical visible light sources whose number is not less than a defined number.

19. The apparatus of claim 12, wherein the devices comprise a first device and second devices; and the determination module is configured to:
   determine the second proximity relation between the first device and the second devices according to the first proximity relation between the first device and one or more visible light sources associated with the first device in the at least one moment and the first proximity relation between each of the second devices and one or more visible light sources associated with each of the second devices in the at least one moment.

20. The apparatus of claim 19, wherein the determination module is configured to:
   determine that a first proximity of the first device and a first set of the second devices is higher than a second proximity between the first device and a second set of the second devices, wherein a first set of visible light sources comprises one or more first visible light sources in highest proximity with each of the first set of the second devices and a second set of visible light sources comprising one or more second visible light sources in highest proximity with the first device is determined to have more identical visible light sources than a third set of visible light sources comprise one or more third visible light sources in highest proximity with each of the second set of the second devices and the second set of visible light sources.

21. The apparatus of claim 19, wherein the determination module is configured to:
   determine that a proximity between the first device and a first set of the second devices is a highest proximity, wherein a set of visible light sources comprise one or more first visible light sources in highest proximity with each of the first set of the second devices and one or more second visible light sources in highest proximity with the first device are determined to have identical visible light sources whose number is not less than a defined number.

22. The apparatus of claim 12, wherein the devices comprise at least one mobile device and the acquisition module is configured to:
   acquire the first proximity relation between the at least one mobile device and at least one visible light source associated with each mobile device of the at least one mobile device in multiple moments of the at least one moment.

23. A non-transitory computer readable storage device comprising executable instructions that, in response to execution, cause a device comprising a processor to perform operations, comprising:
   acquiring a first proximity relation between devices and at least one visible light source associated with each device of the devices in at least one moment, wherein the devices are configured to receive information in a form of visible light; and
   determining a second proximity relation of the devices according to the first proximity relation,
   wherein the acquiring the first proximity relation comprises:
      acquiring light source association information of each device of at least one device of the devices in each moment of the at least one moment, the light source association information comprising a respective identifier of each of the at least one visible light source associated with each device in each moment of the at least one moment, and
      with respect to each device of the at least one device, determining the first proximity relation between each device and the at least one visible light source associated with each device in the at least one moment according to the light source association information of each device in each moment of the at least one moment, and
   wherein the determining the second proximity relation of the devices according to the first proximity relation comprises at least one of:
      sorting the first proximity relation and the second proximity relation, or
      determining the first proximity relation satisfies a condition.

24. The non-transitory computer readable storage device of claim 23, wherein the respective identifier of each of the at least one visible light source associated with each device in each moment is received by each device from associated one or more visible light sources in a form of visible light within a certain time range corresponding to the moment.

25. The non-transitory computer readable storage device of claim 23, wherein the determining the first proximity relation between each device and the at least one visible light source associated with each device in the at least one moment according to the light source association information of each device in each moment of the at least one moment comprises:
   determining that a first proximity between a device and one or more visible light sources associated with the device in a first number of moments is higher than a second proximity between the device and one or more visible light sources associated with the device in a second number of moments fewer than the first number of moments.

* * * * *